United States Patent Office 3,415,618
Patented Dec. 10, 1968

3,415,618
PROCESS FOR PRODUCING HIGH PURITY ALUMINUM NITRATE SOLUTIONS FROM LOW GRADE ALUMINOUS ORES OF INTERMEDIATE IRON CONTENT
Anthony W. Yodis, Whippany, and Walter G. Schnoor, Morristown, N.J., assignors to Allied Chemical Corporation, New York, N.Y., a corporation of New York
No Drawing. Continuation-in-part of application Ser. No. 489,379, Sept. 22, 1965. This application Mar. 12, 1968, Ser. No. 712,373
8 Claims. (Cl. 23—102)

ABSTRACT OF THE DISCLOSURE

Production of high purity aluminum nitrate solutions by the nitric acid digestion of iron-contaminated aluminous ores of initial $Al_2O_3$ to $Fe_2O_3$ weight ratios between about 12:1 and about 20:1, carried out using stoichiometric deficiencies of aqueous nitric acid of $HNO_3$ concentrations between about 15% and about 35% and temperatures between 140° C. and 220° C.

---

This application is a continuation-in-part of our copending application Ser. No. 489,379, filed Sept. 22, 1965 and now abandoned.

This invention relates to a process for producing substantially iron-free aluminum nitrate solutions from low grade aluminous ores of intermediate iron contents, which solutions are adapted for use in the production of cell grade alumina.

Cell grade alumina, that is, alumina of the high purity required for reduction to aluminum metal in electrolytic cells, has been produced in the past, principally from high grade bauxites containing high proportions of aluminum and low proportions of silica and iron, by digesting the ore with caustic alkalis according to the well known Bayer process.

Such processes are not well adapted to the extraction of alumina from ores containing appreciable percentages of silica and, for treatment of such ores, various acid extraction processes have been proposed, including extraction with nitric acid.

In copending application, Ser. No. 390,141, filed Aug. 17, 1964, now Patent No. 3,383,166, there is disclosed a process for producing substantially iron-free aluminum nitrate solutions from low grade (i.e., high silica content) aluminous ores of high iron contents, or from ores in which the iron content is augmented by addition of iron; such ores containing at least about 0.1 part of $Fe_2O_3$ per part of $Al_2O_3$ in the ore, i.e., a ratio of alumina to iron oxide of 10:1 or less. Digestion of such ores with concentrated nitric acid of 30% to 60% concentration at temperatures above about 140° C. results in solution of the aluminum values with insolubilization of most of the iron content and precipitation and elimination of the iron. In this manner it has been possible to produce aluminum nitrate solutions having $Fe_2O_3$ to $Al_2O_3$ ratios as low as 1:2,000 which are capable of refining by processing including crystallization steps to produce aluminas of the required low iron contents.

The copending application teaches that low grade aluminous ores having $Al_2O_3$ to $Fe_2O_3$ ratios higher than 10:1 are unsuitable in producing aluminum nitrate solutions of satisfactorily low $Fe_2O_3$ to $Al_2O_3$ ratios, due presumably to iron solubility factors not clearly understood. It was therefore believed, up to the time of our present invention, that aluminous ores of such intermediate iron contents could only be processed satisfactorily by treating them with added iron oxide or other precipitant or extractant for the iron oxide content.

The prior art thus provided satisfactory procedures for producing cell grade aluminas from high grade ores of either high or low iron contents, as by the Bayer caustic process, and from low grade ores of high iron contents of at least about 10%, as by copending application, Ser. No. 390,141, now Patent No. 3,383,166. However, no practicable process, to our knowledge, was available for the production of cell grade aluminas, or of aluminum nitrate solutions of sufficiently low iron contents for production of cell grade alumina, from low grade aluminous ores with high silica content and intermediate iron contents, that is, from aluminous ores having ratios of $Al_2O_3$ to $Fe_2O_3$ between about 12:1 and about 20:1. Vast quantities of ores, particularly clays, of this intermediate iron content are available in many parts of the United States, notably Georgia, New Jersey, Oregon, Arkansas, Ohio, the Carolinas etc., but have been considered virtually useless for producing cell grade alumina because of the lack of an economic method for eliminating their iron contents.

We have now found that low grade aluminous ores of intermediate iron contents, namely those having an $Al_2O_3$ to $Fe_2O_3$ ratio between about 12:1 and about 20:1, preferably between about 14:1 and about 20:1, can be processed to yield aluminum nitrate solutions of high purities, exhibiting $Al_2O_3$ to $Fe_2O_3$ ratios of at least about 2000 to 1 by digesting the aluminous ore with a dilute aqueous nitric acid solution of $HNO_3$ concentration between about 15% and about 35%, preferably between about 20% and about 30%, in a quantity to provide less than the stoichiometric amount of $HNO_3$ theoretically required to combine with all the $Al_2O_3$ present, preferably between about 60% and about 85%, for a period of at least about ½ hour, preferably about ½ to 2 hours, at temperatures between about 140° C. and about 220° C., preferably between about 160° C. and about 200° C., under autogenous pressure, and separating the resulting aluminum nitrate solution from the remaining insoluble sludge. The process produces, directly, solutions of low iron content without the necessity for the addition of iron oxide or of any other iron removal step.

Many naturally occurring aluminous ores, including many clays and low grade bauxites are available, having intermediate iron contents, that is, having alumina to iron oxide ratios coming within the above limits. Such ores are too low in iron to be processed satisfactorily according to the copending application above referred to, and are usually too high in silica to be processed satisfactorily by the Bayer caustic process.

In our present process we can use any of the many available intermediate iron content clays or other low grade ores having $Al_2O_3$ to $Fe_2O_3$ ratios between about 12:1 and about 20:1 regardless of their silica content. The high silica ores, however, benefit by calcining prior to nitric acid digestion, as the calcining breaks the alumina-silica bond, allowing the nitric acid to dissolve the alumina more readily.

Typical iron oxide and alumina analyses of a number of aluminous ores suitable for use in our process are shown below. The major portion of the balance is silica. Among the following ores, those having $Al_2O_3/Fe_2O_3$ values of about 12 to about 20 may be utilized in practice of the invention.

TYPICAL ANALYSES OF SUITABLE ORES

| Ore | Percent $Al_2O_3$ | Percent $Fe_2O_3$ |
|---|---|---|
| Clays: | | |
| East Central Ohio | 22-30 | 2-3.5 |
| South Central Ohio | 20-35 | 2.5 |
| North Central Penn | 30-40 | 2.5 |
| Central Arkansas | 39-41 | 2-3 |
| South Carolina (Aiken County) | 33-35 | 2 |
| Bauxites: British Guiana | 50-61 | 3 |

INDIVIDUAL ANALYSES OF SUITABLE CLAYS

| Origin of clay | Percent $Al_2O_3$ | Percent $Fe_2O_3$ | Percent $SiO_2$ | Ratio $Al_2O_3/Fe_2O_3$ |
| --- | --- | --- | --- | --- |
| Georgia | 36.6 | 1.90 | 45.8 | 19.2 |
| Do | 37.7 | 2.1 | 44.4 | 18.0 |
| Alabama | 37.6 | 1.9 | 45.2 | 19.7 |
| Arkansas | 49.7 | 3.14 | 39.1 | 15.8 |
| Washington | 37.2 | 1.8 | 46.8 | 20.6 |
| Georgia | 42.1 | 3.5 | 39.0 | 12 |

Preferred ores for use in our process are those having $Al_2O_3$ to $Fe_2O_3$ ratios between about 12:1 and about 20:1.

In carrying out the process according to our invention, aluminous ores, especially clays, containing ratios of $Al_2O_3$ to $Fe_2O_3$ between about 12:1 and about 20:1, preferably between about 14:1 and about 20:1, are ground to roughly 4 mesh (Tyler). In some ores, notably the clays, the alumina contents are rendered more soluble by a calcination treatment, i.e., heating at elevated temperatures. Such ores are calcined, for example, by heating to about 650° C. After calcination the ore is pulverized to a fineness such that about 80% passes through a 200 mesh (Tyler) screen. The ground ores are mixed with dilute aqueous nitric acid solutions of not more than about 35% concentration, preferably between about 20% and about 30%, depending on the alumina-to-iron oxide ratio in the ore. An amount of nitric acid is used which supplies less than the stoichiometric quantity of nitric acid ($HNO_3$) required to react with the alumina available in the ore based on the equation $$Al_2O_3 + 6HNO_3 \rightarrow 2Al(NO_3)_3 + 3H_2O$$

Preferably the amount of nitric acid used will be an amount to provide an aluminum nitrate solution containing dissolved, free $Al_2O_3$ in a proportion equivalent to at least about 2% of the total free and combined alumina in the solution, preferably between about 2% and about 8%. A quantity of nitric acid between about 60% and about 85% of that stoichiometrically equivalent to the alumina in the ore based on the above equation is usually satisfactory.

Smaller proportions of nitric acid result in inferior extraction of alumina from the ore, higher proportions promote greater solubility of the iron components of the ore and prevent production of a purified aluminum nitrate capable of providing cell grade alumina.

The nitric acid ore slurry is then heated to convert the aluminum in the ore to aluminum nitrate and dissolved free $Al_2O_3$, and is digested at temperatures between about 140° C. and about 220° C. under autogenous pressure, usually about 80 p.s.i.g. to about 250 p.s.i.g.; for a period sufficient to completely exhaust the nitric acid in the mixture leaving a solution comprising aluminum nitrate and an appreciable proportion of free $Al_2O_3$ dissolved in the aluminum nitrate solution. The small amounts of iron oxide initially present in the ore are essentially insoluble in the aqueous nitric acid of the low concentrations involved and thus remain largely in the sludge with the silica. Furthermore, any ferric nitrate that may form initially is unstable in the dilute aqueous nitric acid solution involved, and precipitates as hydrated alpha ferric oxide which is insoluble in the solution. The aluminum nitrate, on the other hand, is essentially stable and remains in solution.

Digestion is continued until no free nitric acid remains in the solution, usually a period between about 30 minutes and about 2 hours residence time at the digestion temperature, the time depending somewhat on the temperatures used. Longer times may be used, but produce only slightly larger amounts of dissolved alumina. Besides dissolving the major proportion of alumina in the ore, the digestion step dissolves substantially all of the alkali and alkaline earth metal compounds as the nitrates. If these impurities are unusually high, it may be desirable to add sufficient additional nitric acid to compensate for its loss in converting these compounds to their nitrates. The amount of nitric acid used, however, should in all cases be less than that theoretically necessary to convert all the alumina to aluminum nitrate after correction for loss due to solution of the alkali and alkaline earth metal compounds. Thus, the amount of nitric acid used in such cases will be sufficient to convert to nitrates, all of the alkali and alkaline earth metal compounds in the ore and in addition, less than all of the aluminum compounds present.

After completion of the digestion, the solid material is separated from the slurry, after dilution, if desired, as by filtration, settling, or centrifugation to remove undissolved silica and precipitated hydrated ferric oxide (red mud). Metallic oxides inert to nitric acid such as titanium dioxide and the like are also removed at this stage.

The resulting aluminum nitrate solution is substantially iron-free containing a ratio of $Al_2O_3$ to $Fe_2O_3$ not less than about 2000.

In the process of our invention, the simple digestion step serves as a means for eliminating iron from intermediate iron content ores with no subsequent iron removal steps other than crystallization.

After separation of the purified iron-free aluminum nitrate solution, the solution can be concentrated as by evaporation to crystallizing strength, preferably to between about 11% and about 12% $Al_2O_3$ content, and then crystallized as $Al(NO_3)_3 \cdot 9H_2O$ and separated from the mother liquor, leaving additional impurities in the liquor. The crystals thus obtained will have an $$Al_2O_3 : Fe_2O_3$$

ratio appreciably in excess of the 5000:1 ratio required for production of cell grade alumina from such crystals.

The following specific examples further illustrate our invention. Parts are by weight except as otherwise noted.

EXAMPLE 1

(A) A 653 part sample of Arkansas kaolin which had been calcined by heating at 593° C. for 1 hour, having the following composition:

|  | Percent |
| --- | --- |
| $Al_2O_3$ | 46.0 |
| $Fe_2O_3$ | 2.6 |
| Silica | 39.0 |
| Other impurities + $H_2O$ | 12.4 |
| $Al_2O_3/Fe_2O_3$ | 18.1 | was ground to about −100 mesh (Tyler) and was mixed with 2880 parts of 25% aqueous nitric acid, which thus amounted to 65% of the stoichiometric requirement of $HNO_3$ based on the $Al_2O_3$ in the sample. The resulting slurry was heated for 2 hours at 175° C. and then filtered to remove the brown sludge, including silica and precipitated iron which had formed. The filtrate was analyzed and was found to have an $Al_2O_3/Fe_2O_3$ ratio of 2400. The yield of $Al_2O_3$ was 66.5% of the total alumina in the sample.

(B) When Run A was repeated except that a 6-hour digestion time was employed, the ratio of $Al_2O_3/Fe_2O_3$ obtained in the filtrate was 2620, and the yield of $Al_2O_3$ was 66.6%.

(C) When Run A was repeated except that the temperature of digestion was 200° C., and the $Al_2O_3/Fe_2O_3$ ratio was 2440, the yield was 69.3% $Al_2O_3$.

EXAMPLE 2

A 435 part sample of Arkansas kaolin of the composition used in Example 1 above was mixed with 3200 parts of 15% aqueous nitric acid thus amounting to 65% of the stoichiometric requirement for the 200 parts $Al_2O_3$ in the clay. The resulting slurry was heated at 175° C. for 2 hours, and was then filtered to remove silica and precipitated iron. The resulting filtrate was analyzed and found to have a ratio of $Al_2O_3/Fe_2O_3$ of 2600/1 and a 69% yield of $Al_2O_3$.

EXAMPLES 3-10

Aluminous ores of varying ratios of $Al_2O_3$ to $Fe_2O_3$ between 12 and 18 were mixed with aqueous nitric acid solutions of varying strengths using stoichiometric equivalents of $HNO_3$ between 65% and 85%, and acid concentrations of 20% to 35%, and the mixtures were heated for 2 hours at 170°–175° C. The resulting mixtures were cooled, filtered and the resulting aluminum nitrate solutions were analyzed for $Al_2O_3$:$Fe_2O_3$ ratios with the results shown in Table I below.

TABLE I

Alumina/iron ratios of aluminum nitrate solutions obtained by digesting aluminous ores of varying $Al_2O_3/Fe_2O_3$ ratios with 65% to 85% stoichiometric nitric acid of 20% to 30% concentrations for 2 hours at 170°–175° C.

| Ex. No. | Initial $Al_2O_3/Fe_2O_3$ | Percent conc. $HNO_3$ | Percent stoich. $HNO_3$ | Final $Al_2O_3/Fe_2O_3$ |
|---|---|---|---|---|
| 3 | 12 | 25 | 65 | 2,500 |
| 4 | 12 | 35 | 85 | 2,120 |
| 5 | 18 | 25 | 80 | 2,100 |
| 6 | 18 | 25 | 85 | 2,000 |
| 7 | 16 | 25 | 85 | 2,180 |
| 8 | 14 | 30 | 85 | 2,180 |
| 9 | 12 | 25 | 85 | 6,750 |
| 10 | 18 | 20 | 85 | 2,340 |

EXAMPLE 11

The aluminum nitrate solution obtained in Example 5 above, having an $Al_2O_3/Fe_2O_3$ ratio of 2100 was concentrated and recrystallized, thus producing an 89% yield of the $Al_2O_3$ therein as $Al(NO_3)_3 \cdot 9H_2O$. These crystals were analyzed and found to have an $Al_2O_3/Fe_2O_3$ ratio of 8400 which is well above the ratio of 5000 required for producing cell grade alumina.

EXAMPLE 12

To illustrate the inoperability of our process by use of aluminous ores containing very low $Fe_2O_3/Al_2O_3$ ratios, 542 parts of a Georgia kaolin clay having the composition

| | |
|---|---|
| $Al_2O_3$ | 47 |
| $Fe_2O_3$ | 0.9 |
| $SiO_2$ | 52.1 |
| $Al_2O_3/Fe_2O_3$ | 51.1 | was mixed with 2880 parts of a 25% aqueous nitric acid solution amounting to 65% of the stoichiometric equivalent of $Al_2O_3$ in the sample.

The resulting mixture was heated at 175° C. for two hours and then was filtered. The filtrate was analyzed and found to have an $Al_2O_3/Fe_2O_3$ ratio of 792/1 which is unacceptable for the production of cell grade alumina.

While the above describes the preferred embodiments of our invention, it will be understood that departures can be made therefrom within the scope of the specification and claims.

We claim:
1. The process for producing high purity aluminum nitrate solutions, having ratios of $Al_2O_3$ to $Fe_2O_3$ of at least about 2000 to 1, from low grade aluminous ores of intermediate iron contents, which comprises heating, at temperatures between about 140° C. and about 220° C., under autogenous pressure, a mixture of a low grade aluminous ore having an $Al_2O_3$ to $Fe_2O_3$ ratio between about 12:1 and about 20:1, with a quantity of dilute aqueous nitric acid of $HNO_3$ concentration between about 15% and about 35%, sufficient to provide less than the amount of $HNO_3$ theoretically required to convert all the alumina in the ore to aluminum nitrate, for a period of at least about ½ hour, and separating the resulting aluminum nitrate solution from the remaining insoluble sludge.
2. The process according to claim 1 wherein the aluminous ore is clay.
3. The process according to claim 1 wherein the aluminous ore is a low grade bauxite.
4. The process according to claim 1 wherein the ratio of $Al_2O_3$ to $Fe_2O_3$ is between about 14:1 and about 20:1.
5. The process according to claim 1 wherein the nitric acid used has a concentration between about 20% and about 30%.
6. The process according to claim 1 wherein the proportion of nitric acid used is between about 60% and about 85% of that theoretically required to combine with all the alumina present.
7. The process according to claim 1 wherein the temperature employed is between about 160° C. and about 200° C.
8. The process according to claim 1 wherein the heat treatment is carried out for a period of between about ½ and 2 hours.

References Cited

FOREIGN PATENTS 7,951  6/1963  Japan.

OSCAR R. VERTIZ, *Primary Examiner.*

ARTHUR J. GREIF, *Assistant Examiner.*

U.S. Cl. X.R.

23—143